United States Patent
Azuma et al.

(10) Patent No.: US 10,852,315 B2
(45) Date of Patent: Dec. 1, 2020

(54) GROUND SPEED DETECTION DEVICE FOR VEHICLE

(71) Applicant: Kawasaki Jukogyo Kabushiki Kaisha, Kobe (JP)

(72) Inventors: Seiji Azuma, Hyogo (JP); Yoshimoto Matsuda, Kobe (JP); Daisuke Kawai, Kobe (JP); Takashi Okashiro, Kakogawa (JP)

(73) Assignee: KAWASAKI JUKOGYO KABUSHIKI KAISHA

( * ) Notice: Subject to any disclaimer, the term of this patent is extended or adjusted under 35 U.S.C. 154(b) by 150 days.

(21) Appl. No.: 15/252,540

(22) Filed: Aug. 31, 2016

(65) Prior Publication Data

US 2017/0089939 A1 Mar. 30, 2017

(30) Foreign Application Priority Data

Sep. 30, 2015 (JP) ................................. 2015-194736

(51) Int. Cl.
*G01P 3/44* (2006.01)
*G01C 1/00* (2006.01)

(52) U.S. Cl.
CPC . *G01P 3/44* (2013.01); *G01C 1/00* (2013.01)

(58) Field of Classification Search
None
See application file for complete search history.

(56) References Cited

U.S. PATENT DOCUMENTS

| 3,678,256 | A | * | 7/1972 | Harenberg, Jr. | G05D 1/0077 244/195 |
| 5,059,947 | A | * | 10/1991 | Chen | G01P 15/08 340/467 |
| 5,243,564 | A | * | 9/1993 | Ikeda | B60K 31/00 342/104 |
| 5,373,446 | A | * | 12/1994 | Mizukoshi | B60K 31/047 303/172 |

(Continued)

FOREIGN PATENT DOCUMENTS

| EP | 2944526 B1 * | 5/2017 |
| JP | 09-072730 | 3/1997 |

(Continued)

OTHER PUBLICATIONS

Hamid Slimi, Hichem Arioui, Lydie Nouvelière, Saïd Mammar. Motorcycle Speed Profile in Cornering Situation. American Control Conference (ACC 2009), Jun. 2010, Baltimore, MD, United States, pp. 1172-1177, 2010 (Year: 2010).*

(Continued)

*Primary Examiner* — Lina M Cordero

(57) ABSTRACT

A ground speed detection device for a vehicle includes a wheel speed sensor configured to detect a rotational speed of a wheel, a second storage section having stored a radius of the wheel corresponding to a bank angle, and a ground speed calculator configured to calculate a ground speed during cornering. The ground speed calculator extracts the radius of the wheel corresponding to a bank angle detected by a bank angle detection device, from the second storage section, and calculates the ground speed during cornering from the extracted radius of the wheel and the rotational speed of the wheel detected by the wheel speed sensor.

15 Claims, 7 Drawing Sheets

(56) References Cited

U.S. PATENT DOCUMENTS

| | | | | |
|---|---|---|---|---|
| 5,407,023 | A * | 4/1995 | Yamashita | B60K 28/16 180/197 |
| 5,494,344 | A * | 2/1996 | Heyn | B60T 8/172 303/140 |
| 5,959,202 | A * | 9/1999 | Nakajima | B60C 23/061 340/444 |
| 6,438,506 | B1 * | 8/2002 | Yohpe | A01B 63/00 701/56 |
| 7,158,866 | B2 * | 1/2007 | Gustafsson | B60C 23/061 701/1 |
| 7,674,022 | B2 * | 3/2010 | Nakano | B60Q 1/12 362/284 |
| 8,015,874 | B2 * | 9/2011 | Uemura | G01C 19/5776 73/504.12 |
| 8,380,391 | B2 * | 2/2013 | Baino | B62J 6/02 362/37 |
| 8,554,439 | B2 | 10/2013 | Oshima et al. | |
| 2007/0086203 | A1 * | 4/2007 | Nakano | B60Q 1/0683 362/514 |
| 2007/0246903 | A1 * | 10/2007 | Melcher | B62K 5/01 280/124.103 |
| 2008/0112174 | A1 * | 5/2008 | Nakano | B62J 6/02 362/466 |
| 2008/0258415 | A1 * | 10/2008 | Melcher | B60G 7/006 280/124.103 |
| 2009/0030583 | A1 * | 1/2009 | Shimamura | F16H 61/32 701/55 |
| 2009/0326779 | A1 | 12/2009 | Oshima et al. | |
| 2010/0168958 | A1 * | 7/2010 | Baino | B60Q 1/12 701/36 |
| 2010/0326761 | A1 * | 12/2010 | Melcher | B62M 9/00 180/348 |
| 2012/0067122 | A1 * | 3/2012 | Sakamoto | B60Q 1/12 73/493 |
| 2013/0041522 | A1 * | 2/2013 | Mori | G07C 5/0808 701/1 |
| 2013/0233046 | A1 * | 9/2013 | Sasaki | G01C 19/5776 73/1.37 |
| 2014/0129087 | A1 * | 5/2014 | Takenaka | B62K 21/00 701/41 |
| 2015/0112569 | A1 * | 4/2015 | Yamane | B60W 10/184 701/72 |
| 2016/0316616 | A1 * | 11/2016 | Brooks | A01M 7/0089 |

FOREIGN PATENT DOCUMENTS

| | | |
|---|---|---|
| JP | 2004-155404 | 6/2004 |
| JP | 2007-038916 | 2/2007 |
| JP | 2009-008614 | 1/2009 |
| JP | 5325028 | 7/2013 |

OTHER PUBLICATIONS

Lot, Roberto; et al., Real-Time Roll Angle Estimation for Two-Wheeled Vehicles, Proceedings of the ASME 2012 11th Biennial Conference on Engineering Systems Design and Analysis ESDA2012 (Year: 2012).*

* cited by examiner

GROUND SPEED DETECTION DEVICE FOR VEHICLE

CROSS REFERENCE TO THE RELATED APPLICATION

This application is based on and claims Convention priority to Japanese patent application No. 2015-194736, filed Sep. 30, 2015, the entire disclosure of which is herein incorporated by reference as a part of this application.

BACKGROUND OF THE INVENTION (Field of the Invention)

The present invention relates to a ground speed detection device for a vehicle such as a motorcycle of which a vehicle body is banked during cornering.

(Description of Related Art)

In a motorcycle, in the case of detecting a ground speed, the ground speed is often obtained on the basis of the rotational speed of the front wheel and the predetermined radius of a wheel (e.g., JP Patent No. 5325028).

In a motorcycle, a tread surface of the wheel is curved so as to allow the motorcycle to run so as to be banked. Thus, the distance between an axle and a road surface contact point of a tire is different between during straight running and during cornering. Therefore, the accuracy of detecting a ground speed during cornering decreases.

SUMMARY OF THE INVENTION

It is an object of the present invention to provide a ground speed detection device for a vehicle that is able to accurately detect a ground speed even during cornering.

In order to achieve the above-described object, a ground speed detection device for a vehicle according to the present invention is a ground speed detection device for a vehicle that corners in a banked state or condition, the ground speed detection device including: a wheel speed sensor configured to detect a rotational speed, or a rotation number per unit time, of a wheel; a bank amount sensor configured to detect an amount of bank of a vehicle body; a storage section having stored a radial dimension, between an axle and a road surface contact point of the wheel, corresponding to the amount of bank of the vehicle body; and a ground speed calculator configured to extract the radial dimension corresponding to the amount of bank detected by the bank amount sensor, from the storage section, and to calculate a ground speed of the vehicle on the basis of the extracted radial dimension and the rotational speed of the wheel detected by the wheel speed sensor. The wording "amount of bank" includes a bank angle and a bank-related value related to the bank angle. The wording "bank-related value" includes, for example, a difference between the front wheel speed and the rear wheel speed, a bank angle speed, a bank angle acceleration or the like.

According to this configuration, the ground speed, that is, the vehicle speed, is calculated on the basis of the radius of the wheel corresponding to the amount of bank during cornering. Therefore, the vehicle speed can be accurately detected even during cornering.

In the ground speed detection device for the vehicle according to the present invention, preferably, the ground speed detection device is configured to be able to detect the ground speed at each of a front wheel and a rear wheel, and selects a wheel for calculating the ground speed, on the basis of a predetermined selection condition. According to this configuration, the ground speed can be calculated according to a situation during running, and therefore, the vehicle speed can be more accurately detected.

In the case where the ground speed detection device is configured to be able to detect the ground speed at each of the front wheel and the rear wheel, preferably, the predetermined selection condition includes a rear wheel selection condition for setting the wheel for calculating the ground speed to the rear wheel; the rear wheel selection condition includes the front wheel being raised or the front wheel slipping on a road surface; when the rear wheel selection condition is satisfied; the ground speed is calculated by using the rear wheel; and when the rear wheel selection condition is not satisfied, the ground speed is calculated by using the front wheel. Although the rear wheel, which is a drive wheel, easily slips, the ground speed is calculated by using the front wheel according to this configuration, and therefore, the vehicle speed can be accurately detected. In addition, in the case that the front wheel slips or that the front wheel is separated from the road surface due to wheelie or the like, the ground speed is calculated by using the rear wheel, and therefore, the accuracy of detecting the vehicle speed improves.

Instead of or in addition to this, when an abnormality in a wheel speed sensor for one of the front and rear wheels is detected, the ground speed may be calculated by using the other wheel. According to this configuration, when an abnormality in a wheel speed sensor for one of the front and rear wheels is detected, the ground speed is calculated by using the other wheel, and therefore, the accuracy of detecting the vehicle speed improves.

In the ground speed detection device for the vehicle according to the present invention, the bank amount sensor preferably calculates the amount of bank on the basis of a balance state where a centrifugal force acting on a moving body including the vehicle and a loaded body on the vehicle and a gravitational force acting on the moving body during cornering are in balance with each other. Here, the "loaded body" is an object that is loaded on the vehicle and moves with the vehicle, and includes a rider riding the vehicle. In addition, the "center of gravity of the moving body" refers to a center of gravity of the moving body obtained by combining the vehicle and the loaded body. Furthermore, the "balance state" refers to a state where a force obtained by combining a gravitational force acting on the moving body and a centrifugal force acting on the moving body is directed along a tilted axial line connecting a center, in a vehicle widthwise direction, of a lower surface of the wheel and the center of gravity of the moving body, in other words, a state where a force acting on the moving body in a direction perpendicular to the tilted axial line is zero. According to this configuration, the bank angle is obtained on the basis of a simple balance equation, and therefore, the vehicle speed during banking can be obtained at a low calculation load.

In this case, preferably, the bank amount sensor calculates a moving body bank angle on the basis of an inertia force about a longitudinal axis of the vehicle acting on the vehicle body, and further corrects the moving body bank angle, to calculate, as the amount of bank, a vehicle body bank angle that is a gradient of a center of gravity of the vehicle body with respect to a vertical line. According to this configuration, the vehicle speed can be accurately calculated even in a lean-in or lean-out state.

A ground speed detection method for a vehicle according to the present invention is a ground speed detection method for a vehicle that corners in a banked condition, wherein the vehicle includes a wheel speed sensor configured to detect a rotational speed of a wheel, a bank amount sensor configured to detect an amount of bank of a vehicle body, and a storage section having stored a radial dimension, between an axle and a road surface contact point of the wheel, corresponding to the amount of bank of the vehicle body, and the ground speed detection method includes the steps of: extracting the radial dimension corresponding to the amount of bank detected by the bank amount sensor, from the storage section; and calculating a ground speed of the vehicle on the basis of the extracted radial dimension and the rotational speed of the wheel detected by the wheel speed sensor.

According to this configuration, since the ground speed, that is, the vehicle speed, is calculated on the basis of the radius of the wheel corresponding to the bank angle during cornering, the vehicle speed can be accurately detected even during cornering.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. In this specification, the terms "left side" and "right side" are the left side and the right side, respectively, as viewed from a rider riding a motorcycle.

Figure 1:
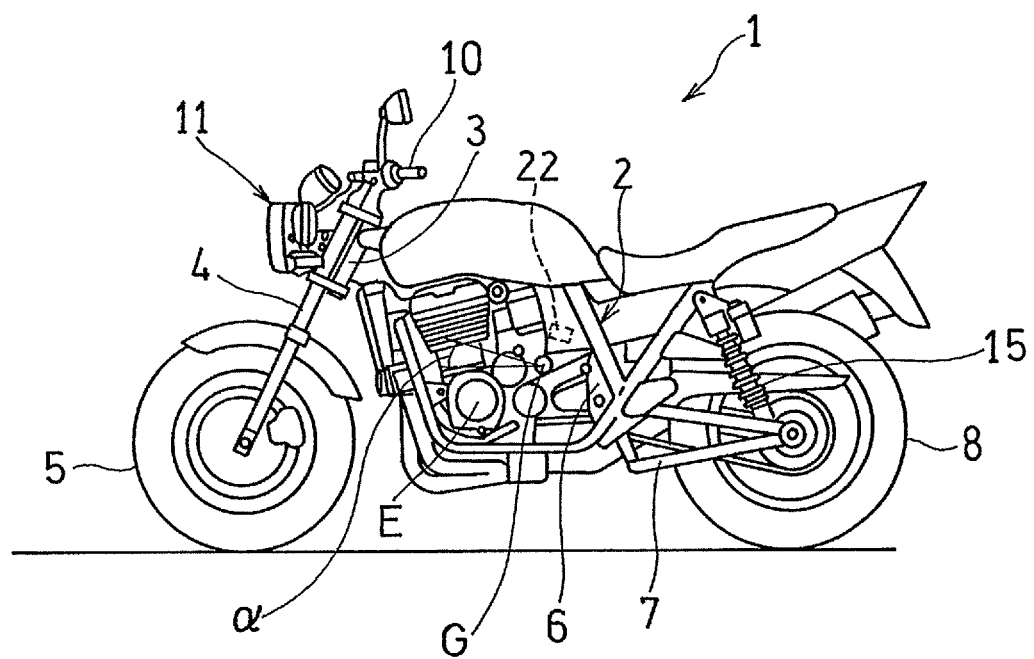
FIG. 1 is a side view showing a motorcycle including a ground speed detection device according to a first embodiment of the present invention.

FIG. 1 is a side view of a motorcycle 1 that is a kind of a vehicle including a bank angle detection device for a vehicle according to a first embodiment of the present invention. In the motorcycle 1, a front fork 4 is supported by a head pipe 3 at the front end of a motorcycle frame structure 2, and a front wheel 5 is fitted to the front fork 4. A swingarm 7 is supported by a swingarm bracket 6 at a lower intermediate portion of the motorcycle frame structure 2, and a rear wheel 8 is fitted to the swingarm 7. An engine E is fitted to the lower intermediate portion of the motorcycle frame structure 2. The engine E drives the rear wheel 8. That is, the rear wheel 8 is a drive wheel, and the front wheel 5 is a driven wheel.

A steering handle 10 is fixed to an upper end portion of the front fork 4. A rear wheel suspension device 15 is mounted between the swingarm 7 and the motorcycle frame structure 2. A headlamp device 11 is mounted on the front fork 4. In a motorcycle including a cowling or fairing, the headlamp device 11 may be mounted on a motorcycle frame structure via the cowling. An angular velocity sensor 22 that detects an angular velocity about a predetermined axis is provided in the vicinity of the center of gravity G of a vehicle body.

Figure 5:
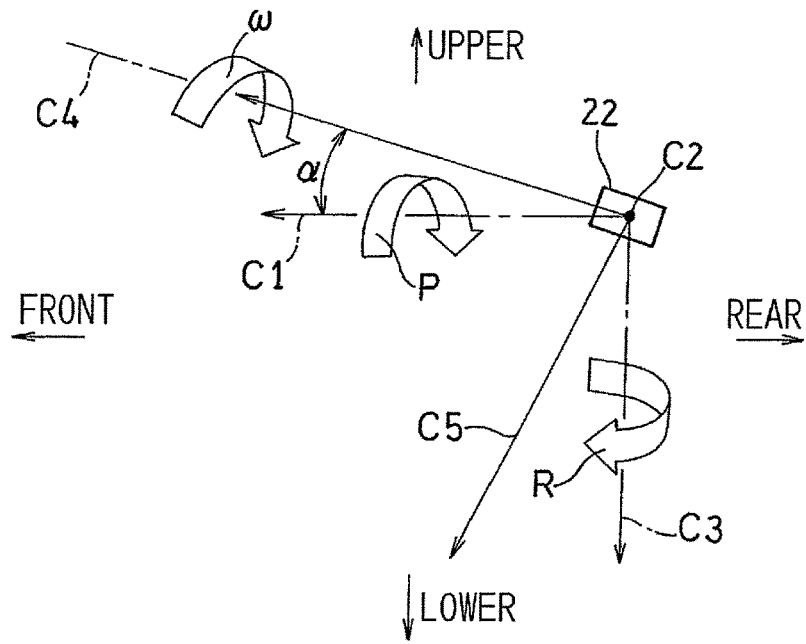
FIG. 5 is a diagram showing a relationship between a vehicle body coordinate and a sensor mounting coordinate.

As shown in FIG. 5, three axes passing through a reference point that is set in the angular velocity sensor 22, specifically, a front-rear axis or longitudinal axis C1, a right-left axis or transverse axis C2, and an up-down axis C3, are defined in the vehicle body. The longitudinal axis C1 extends horizontally and in a front-rear or longitudinal direction of the motorcycle in a straight running state of the vehicle body. The transverse axis C2 extends horizontally and in a right-left or vehicle widthwise direction in the straight running state of the vehicle body. The up-down axis C3 is perpendicular to the longitudinal axis C1 and the transverse axis C2 and extends in the vertical direction in the straight running state of the vehicle body. The respective axes C1 to C3 are perpendicular to each other at the sensor reference point. The angular velocity sensor 22 according to the present embodiment is obliquely disposed on the vehicle body such that at least one sensor detection direction C4 is tilted about the transverse axis C2 at a predetermined tilt angle α with respect to the longitudinal axis C1 of the vehicle body.

The angular velocity sensor 22 is, for example, a gyro sensor, and detects an angular velocity ω about a first sensor axis C4 that passes through the transverse axis C2 on a plane including the longitudinal axis C1 and the up-down axis C3 and is set at a position angularly displaced from the longitudinal axis C1 by the predetermined tilt angle α. The detection angular velocity ω detected by the angular velocity sensor 22 includes: an estimation roll rate P component that is an angular velocity about the longitudinal axis C1; and an estimation yaw rate R component that is an angular velocity about the up-down axis C3. By setting the tilt angle α, the angular velocity sensor 22 has a second sensor axis C5 that is angularly displaced from the up-down axis C3 by the tilt angle α.

Figure 2:
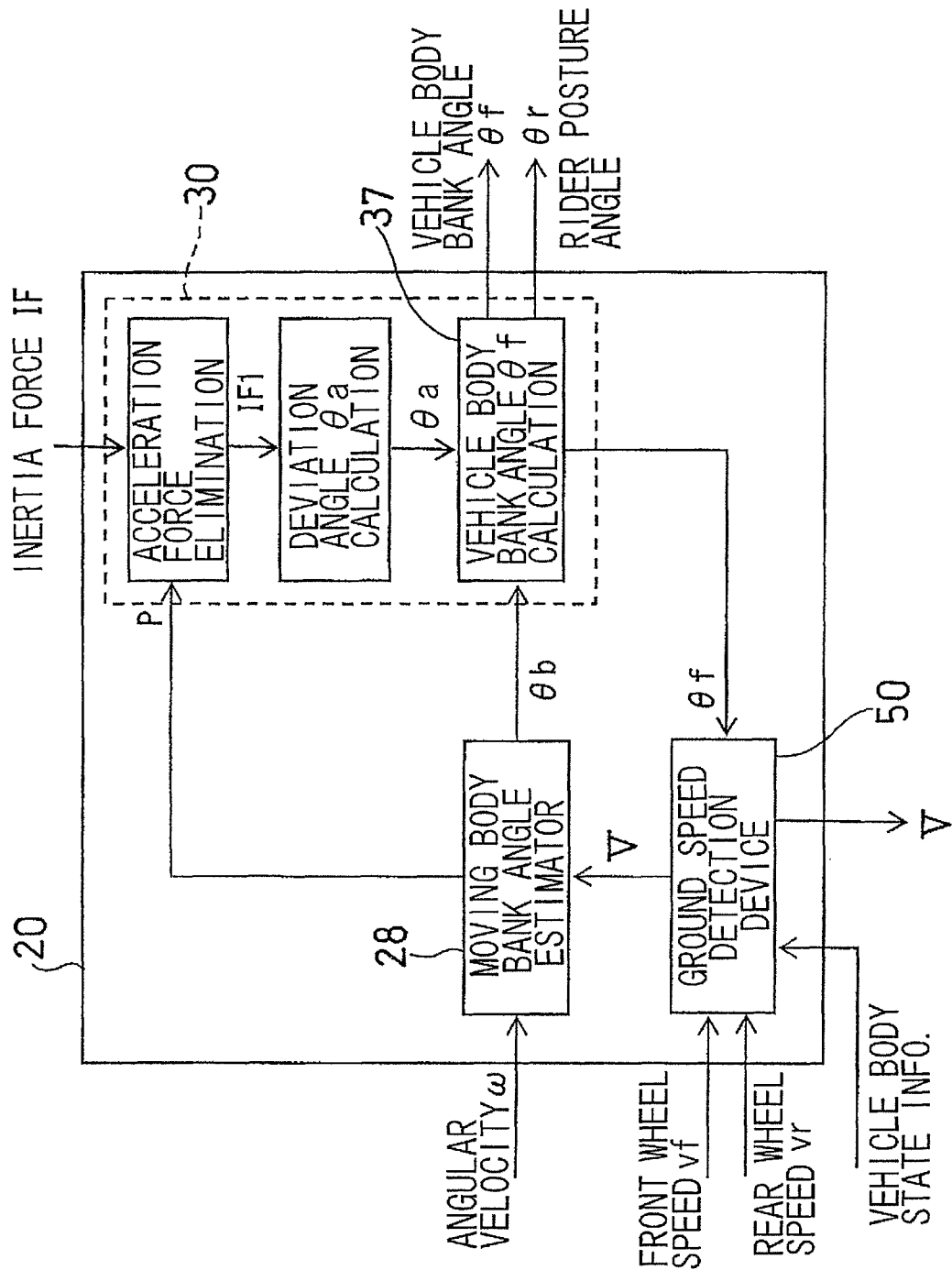
FIG. 2 is a simplified block diagram showing a schematic configuration of a bank angle detection device and the ground speed detection device of the motorcycle.

As shown in FIG. 2, the motorcycle 1 according to the present embodiment includes a bank angle detection device 20 that estimates a bank angle of the vehicle during cornering, that is, a bank angle of the motorcycle 1. In the following description, the bank angle of the motorcycle 1 estimated by the bank angle detection device 20 is referred to as an "estimation bank angle of the vehicle body". The bank angle detection device 20 is composed of a processor (CPU), and includes: a memory section in which a program is stored; a processing section that reads the program from the memory section and executes the program; and an input-output section that inputs and outputs signals to and from an external device. In the memory section, parameters (the tilt angle α, a gravitational acceleration g, etc.) required for calculation are stored in addition to the program.

The bank angle detection device 20 includes a bank angle estimator 28, a ground speed detection device 50, and a correcting section 30. Each of the bank angle estimator 28, the ground speed detection device 50, and the correcting section 30 includes a program, a memory in which the program is stored, and a to processing circuit that executes the program. In the following description, the bank angle estimator 28, the ground speed detection device 50, and the correcting section 30 will be described separately on the basis of their functions, but may be configured with a single program.

The bank angle estimator 28 estimates a moving body bank angle θb, in a lean-with posture on the basis of the detection angular velocity ω and a vehicle speed V. Here, the "lean-with posture" refers to a posture or state where the center of gravity G2 of the rider occupies a position on the vertical center line C3 of the vehicle body.

Figure 4:
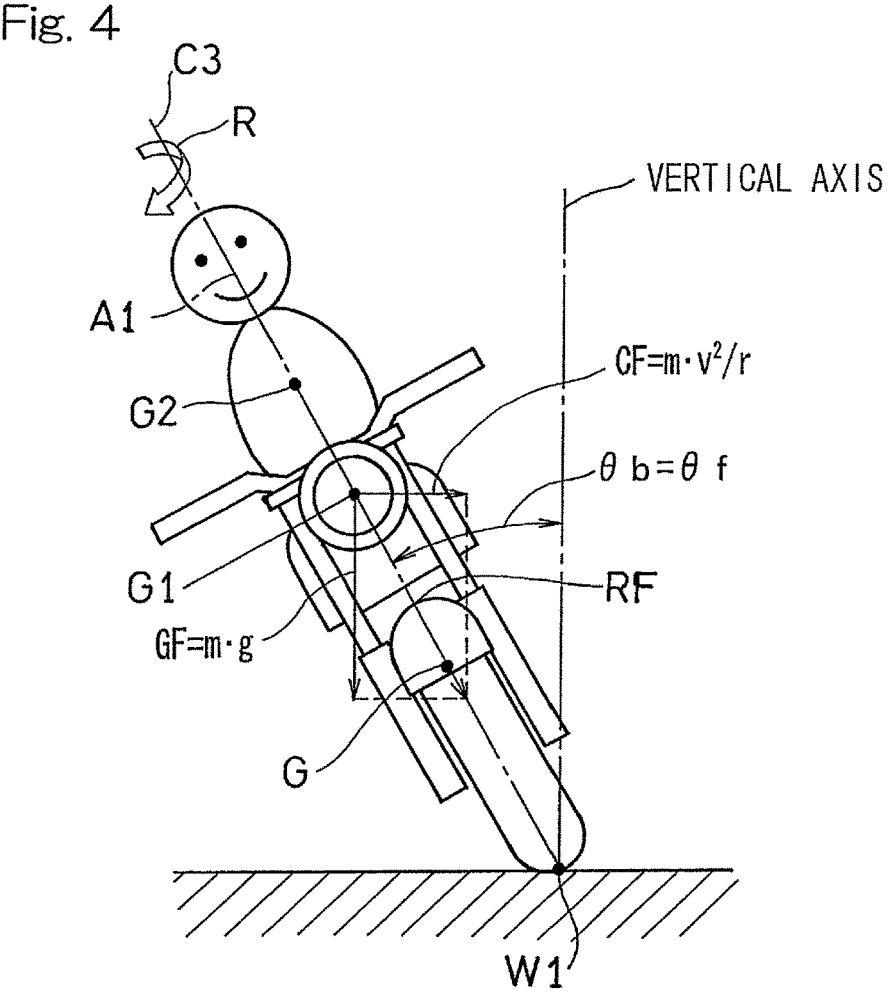
FIG. 4 is a front view showing a banked condition during lean-with of a motorcycle.
Figure 9:
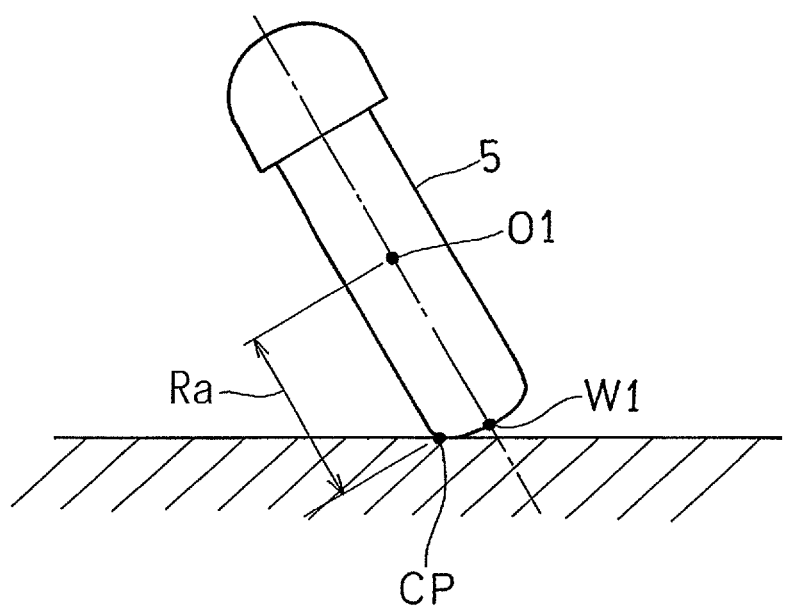
FIG. 9 is a front view showing a ground contact state of a wheel during banking.

As shown in FIG. 4, on the basis of a balance state where a centrifugal force CF acting on a moving body including the vehicle body and a loaded body and a gravitational force GF acting on the moving body during cornering are in balance with each other, the bank angle estimator 28 estimates a moving body bank angle θb that is the gradient of the center of gravity of the moving body with respect to a vertical line on a virtual plane perpendicular to the longitudinal axis, specifically, in the present embodiment, the gradient of a moving body axial line A1 connecting a center W1, in a vehicle widthwise direction, of a lower surface of the wheel 5 and the center of gravity G1 of the moving body. As shown in FIG. 9, a ground contact point CP is displaced from the center W1, in the vehicle widthwise direction, of the wheel 5 when the vehicle body is tilted. The moving body axial line A1 may be a straight line connecting the ground contact point CP of the wheel 5 and the center of gravity G1 of the moving body.

Here, the "loaded body" refers to an object moving with the motorcycle 1, other than the motorcycle body. Specifically, the "loaded body" includes the rider riding the motorcycle 1. The loaded body may include, in addition to the rider, a passenger, a baggage or etc. In addition, the "center of gravity G1 of the moving body" refers to the center of gravity G1 of the moving body obtained by combining the motorcycle 1 and the loaded body. Moreover, the "balance state" refers to a state where a force obtained by combining the gravitational force and the centrifugal force is directed along the tilted axial line A1, in other words, a state where a force in a direction perpendicular to the tilted axial line A1 is zero.

The correcting section 30 shown in FIG. 2 corrects the moving body bank angle θb in the case where the present state is not the lean-with state, that is, in a state where the posture of the rider is displaced to one side in the vehicle widthwise direction with respect to the center line of the vehicle body. Specifically, the correcting section 30 calculates an estimation bank angle θf of the vehicle body on the basis of the moving body bank angle θb and a first force IF about the longitudinal axis acting on the vehicle body. The estimation bank angle θf of the vehicle body is the gradient of the center of gravity G of the vehicle body with respect to the vertical line. In the lean-with state, the estimation bank angle θf of the vehicle body is the gradient of the motorcycle 1 in which the centrifugal force acting on the moving body and the gravitational force acting on the moving body are in balance with each other. In the lean-with state, the estimation bank angle θb of the moving body is equal to the estimation bank angle θf of the vehicle body (θb=θf).

The correcting section 30 eliminates an acceleration force IF2 about the longitudinal axis from the force IF about the longitudinal axis acting on the vehicle body, with the use of the estimation roll rate P of the moving body that is obtained in a process of estimating a bank angle, so as to obtain an inertia force IF1 about the front-rear axis or longitudinal axis C1 acting on the vehicle body. Thereafter, the correcting section 30 calculates a deviation angle (difference value) θa from the inertia force IF1 and the estimation bank angle θb of the moving body, and corrects the moving body bank angle θb on the basis of the deviation angle θa, so as to calculate the estimation bank angle θf of the vehicle body. A posture angle θr of the rider can also be obtained by the correcting section 30.

The correcting section 30 includes a correction calculator 32 that corrects the force IF about the longitudinal axis that is detected by the inertia force sensor 26 (FIG. 3), on the basis of the estimation roll rate P that is an angular velocity about the longitudinal axis C1 (FIG. 5) acting on the vehicle body, so as to obtain the inertia force IF1 about the longitudinal axis acting on the vehicle body. As the estimation roll rate P, a value obtained in a process of the bank angle estimator 28 calculating the moving body bank angle θb as described later can be used.

Specifically, the correction calculator 32 calculates an angular acceleration about the longitudinal axis acting on the vehicle body, from the estimation roll rate P, and eliminates the acceleration force IF2 about the longitudinal axis from the force IF (inertia force+acceleration force) about the longitudinal axis that is detected by the inertia force sensor 26, so as to obtain the inertia force IF1 about the longitudinal axis acting on the vehicle body. The correcting section 30 calculates the estimation bank angle θf of the vehicle body on the basis of the inertia force IF1 about the longitudinal axis that is calculated by the correction calculator 32.

The ground speed detection device 50 calculates a vehicle speed corresponding to the state of the motorcycle 1. Specifically, the ground speed detection device 50 selects which of the front wheel 5 and the rear wheel 8 is to be used for obtaining a ground speed, in accordance with the state of the motorcycle 1, and calculates a vehicle speed (ground speed) V corresponding to the bank angle (amount of bank) of the motorcycle 1.

Here, the "ground speed" refers to a speed of the vehicle with respect to a road surface. The ground speed is a value proportional to a ground-contacting wheel speed when no slip occurs during straight running. During wheelie, during slip and during puncture, the proportionality to the ground-contacting wheel speed is disrupted as compared to during straight running. The wheelie refers to a state where the front wheel is separated from the road surface, and in this case, the proportionality between the ground speed and the front wheel speed is disrupted since no force is transmitted from the road surface to the front wheel. The slip is a state where the front wheel is sliding on the road surface by a predetermined distance or longer, and in this case, although a force is transmitted from the road surface to the front wheel, the proportionality between the ground speed and the front wheel speed is disrupted as compared to a state where no slip occurs.

Specifically, the ground speed detection device 50 calculates the vehicle speed V from the bank angle of the motorcycle 1, a rotational speed of the front wheel 5, and a rotational speed vr of the rear wheel 8. The obtained vehicle speed V is outputted to an electronic control unit (ECU), a meter and the bank angle estimator 28. Thus, the accuracy of the estimation by the bank angle estimator 28 improves. In addition, the ground speed detection device 50 calculates the vehicle speed V with the use of the estimation bank angle θf of the vehicle body that is calculated by the correcting section 30. Thus, the accuracy of calculating the vehicle speed V improves. The calculated estimation bank angle θf of the vehicle body and the calculated vehicle speed V are outputted to an ECU for engine control and an ECU for vehicle body control, etc. and are used for engine control and vehicle body control. The posture angle θr of the rider may be used for engine control and vehicle body control.

The bank angle detection device 20 further includes the inertia force sensor 26 that detects the inertia force IF. The inertia force sensor 26 detects a force (including an inertia force and an acceleration force) about the longitudinal axis C1 acting on the vehicle body. In the present embodiment, the inertia force sensor 26 is included in a sensor unit that constitutes the gyro sensor (angular velocity sensor 22). However, the inertia force sensor 26 and the angular velocity sensor 22 may be separately provided.

Figure 3:
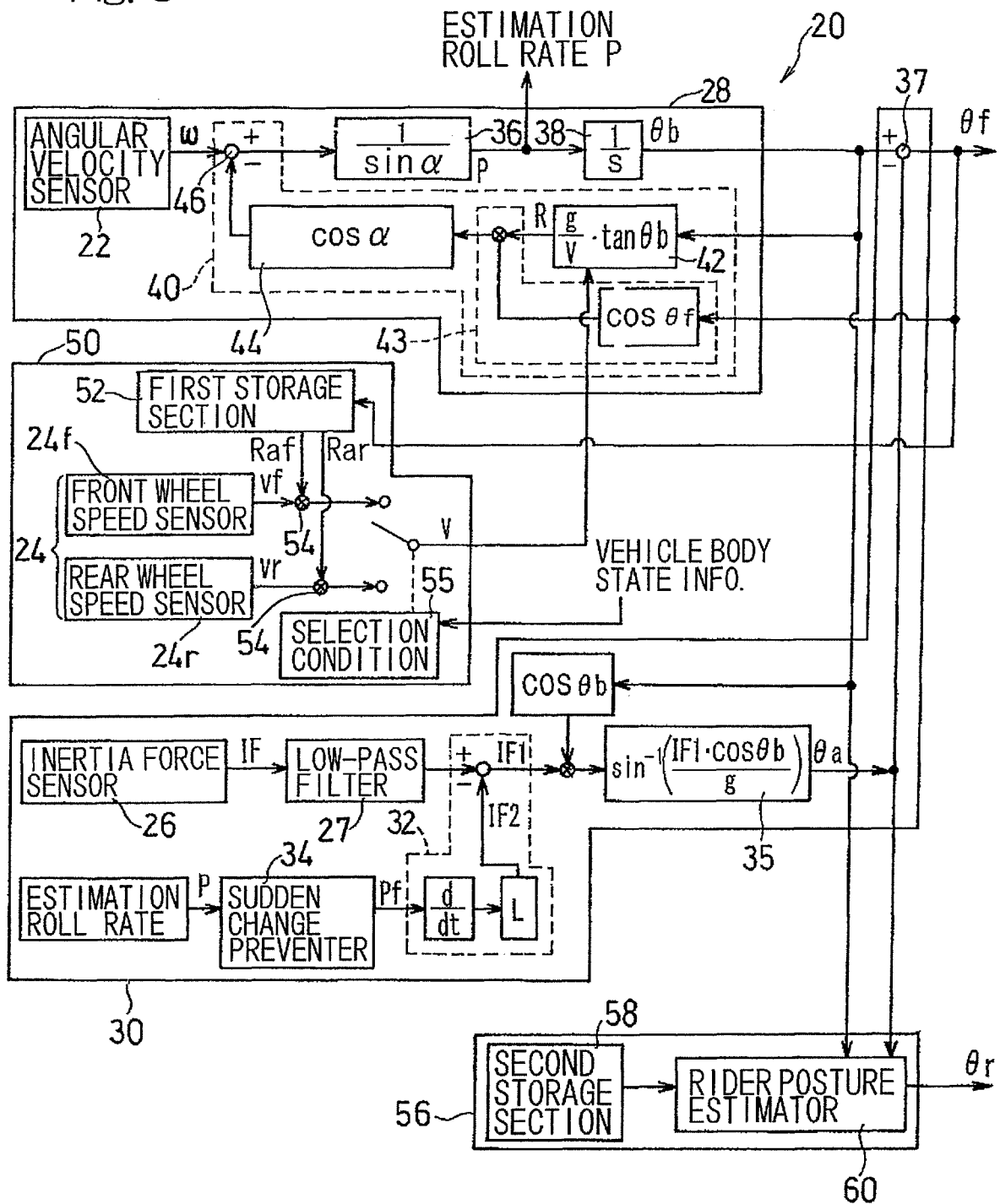
FIG. 3 is a block diagram showing the schematic configuration of the bank angle detection device and the ground speed detection device of the motorcycle.

As shown in FIG. 3, the bank angle detection device 20 includes the angular velocity sensor 22, a wheel speed sensor 24 for detecting each of rotational speeds of the front and rear wheels of the motorcycle 1, and the bank angle estimator 28. The bank angle estimator 28 calculates the estimation bank angle θb of the motorcycle 1 on the basis of the angular velocity ω detected by the angular velocity sensor 22, the tilt angle α, a wheel rotational speed v detected by the wheel speed sensor 24 and the ground speed V (hereinafter, sometimes referred to merely as "vehicle speed") calculated from a later-described radius Ra of the wheel.

The correcting section 30 further includes a sudden change preventer 34 that inhibits a sudden change in the estimation roll rate P. The correction calculator 32 calculates the inertia force IF1 about the longitudinal axis acting on the vehicle body, with the use of an estimation roll rate Pf resulting from processing by the sudden change preventer 34. Specifically, the correction calculator 32 performs time differentiation of the estimation roll rate Pf after the processing, so as to calculate an angular acceleration. Subsequently, the correction calculator 32 multiplies the resultant differentiation value by the distance L between the inertia force sensor 26 and the center of gravity G of the vehicle body, so as to calculate the acceleration force IF2 about the longitudinal axis at the sensor position. Thereafter, the correction calculator 32 eliminates the acceleration force IF2 from the output value IF of the inertia force sensor 26, that has been passed through a low-pass filter 27 to remove noise therefrom, so as to calculate the inertia force IF1 about the longitudinal axis acting on the vehicle body.

In the present embodiment, a low-pass filter, that allows only a value equal to or lower than a predetermined limit value to pass therethrough, is used as the sudden change preventer 34. However, each of the low-pass filter 27 and the sudden change preventer 34 is not limited thereto, and may be, for example, averaging processing, delay processing, integration processing, or the like.

The correcting section 30 includes a difference value calculator 35 that calculates the above difference value θa from the inertia force IF1 about the longitudinal axis, that acts on the vehicle body and is calculated by the correction calculator 32, and the estimation bank angle θb detected by the bank angle detection device 20. The correcting section 30 further includes a vehicle body bank angle estimator 37 that calculates an estimation bank angle of the vehicle body from the difference value θa calculated by the difference value calculator 35 and the moving body bank angle θb calculated by the bank angle estimator 28.

As shown in FIG. 3, the bank angle estimator 28 includes: a roll rate estimation circuit 36 that calculates the estimation roll rate P from the output ω of the angular velocity sensor 22, a later-described estimation yaw rate R and the vehicle speed V; an angular velocity integration circuit 38 that performs time integration of the estimation roll rate P and outputs the estimation bank angle θb; and a feedback circuit 40 that calculates the estimation yaw rate R, which is an angular velocity about the up-down axis C3 (FIG. 4) of the motorcycle 1, on the basis of the vehicle speed V and the estimation bank angle θb of the moving body, and performs negative feedback of the estimation yaw rate R to the angular velocity ω.

The bank angle estimator 28 estimates the moving body bank angle θb on the basis of a roll rate component extracted from the detection angular velocity ω of the angular velocity sensor 22. In extracting the roll rate component, the correcting section 30 eliminates a yaw rate component of the detection angular velocity ω of the angular velocity sensor 22 on the basis of the moving body bank angle θb and the estimation bank angle θf of the vehicle body. Accordingly, the roll rate component is extracted in consideration of the difference between the center of gravity G1 of the moving body and the center of gravity G of the vehicle body, and therefore, the estimation bank angle θf of the vehicle body can be accurately obtained.

The feedback circuit 40 includes: a yaw rate estimator 42 that calculates the estimation yaw rate R on the basis of the vehicle speed V and an estimation bank angle θbo of the moving body that is calculated last; a yaw rate correction circuit 43 that performs feedback of the estimation bank angle θf of the vehicle body and corrects the estimation yaw rate R; a yaw rate component estimator 44 that multiplies the corrected estimation yaw rate R by cos α so as to calculate a yaw rate component of the angular velocity sensor 22; and a negative feedback circuit 46 that performs negative feedback of the value of the yaw rate component to the detection angular velocity ω which is a detection value of the angular velocity sensor 22. The negative feedback circuit 46 is a subtracter in the present embodiment.

That is, the estimation bank angle θb of the moving body is obtained from the estimation roll rate P that is corrected on the basis of the estimation yaw rate R every time. Thus, accumulation of influence of zero-point offset of the angular velocity sensor 22 or an integration error over time is avoided.

A method for estimating the moving body bank angle θb by the bank angle estimator 28 will be described. First, the case of the lean-with state will be described with reference to FIGS. 4 and 5. A cornering radius of the motorcycle 1 is denoted by r, and a gravitational acceleration is denoted by g. As shown in FIG. 4, when the mass of the moving body is denoted by m, the centrifugal force CF acting on the center of gravity G1 of the moving body is obtained by the following equation (1):

$$CF = m \cdot V \cdot V / r \qquad (1).$$

The estimation yaw rate R when the vehicle body is tilted from the vertical axis at the bank angle θb can be represented by the following equation (2):

$$R = V/r \quad (2).$$

Thus, when equation (2) is substituted into equation (1), the centrifugal force CF is obtained from the following equation (3):

$$CF = m \cdot V \cdot R \quad (3).$$

In addition, when the vehicle body is titled at the bank angle θb, the centrifugal force CF and the gravitational force m·g acting on the vehicle body establish a relationship obtained by the following equation (4):

$$\tan \theta b = CF/(m \cdot g) \quad (4).$$

Thus, when equation (3) is substituted into equation (4), the following equation is established:

$$\tan \theta b = V \cdot R/g \quad (5).$$

As shown in FIG. 5, the angular velocity sensor 22 is provided so as to be tilted at the tilt angle α with respect to the longitudinal axis C1. Thus, by coordinate transformation from a vehicle body coordinate (C1, C3, C2) to a sensor mounting coordinate (C4, C5, C2), roll rate component P·sin α including the roll rate P and yaw rate component R·cos α including the yaw rate R are combined, and the angular velocity ω measured by the angular velocity sensor 22 is obtained by the following equation (6):

$$\omega = P \cdot \sin \alpha + R \cdot \cos \theta b \cdot \cos \alpha \quad (6).$$

Here, P and R are not direct measured values, and thus are referred to as estimation roll rate P and estimation yaw rate R, respectively, below.

When the estimation yaw rate R is obtained from the above equation (5) and substituted to equation (6), the estimation roll rate P is obtained from the following equation (7):

[Math. 1]

$$P = \frac{\omega - \frac{g}{V} \cdot \tan\theta b \cdot \cos\theta b \cdot \cos\alpha}{\sin\alpha} = \frac{\omega - \frac{g}{V} \sin\theta b \cdot \cos\alpha}{\sin\alpha} \quad (7)$$

By integrating the estimation roll rate P, the moving body bank angle θb is calculated. That is, when the estimation bank angle of the moving body that has been calculated last is denoted by θbo, the moving body bank angle θb is obtained from the following equation (8):

[Math. 2]

$$\theta b = \int \frac{\omega - \frac{g}{V} \sin\theta bo \cdot \cos\alpha}{\sin\alpha} \quad (8)$$

The yaw rate estimator 42 in FIG. 3 calculates the estimation yaw rate R (=g·tan θbo/V) on the basis of the above equation (5) from the last moving body bank angle θbo and the vehicle speed V calculated from the wheel speed sensor 24. The yaw rate correction circuit 43 multiplies the estimation yaw rate R by cos θb on the basis of the last estimation bank angle θb (θf=θb in the lean-with state) of the vehicle body, so as to correct the estimation yaw rate R.

The yaw rate component estimator 44 multiplies corrected estimation yaw rate R·cos θb by cos α, so as to calculate yaw rate component R·cos θb·cos α that is to be detected by the angular velocity sensor 22. The negative feedback circuit 46 subtracts yaw rate component R·cos θb·cos α from the angular velocity ω (=P·sin α+R·cos θb·cos α) measured by the angular velocity sensor 22, and outputs roll rate component P·sin α that is to be included in the detection angular velocity ω of the angular velocity sensor 22.

The roll rate estimation circuit 36 divides estimation roll rate component P·sin α by sin α so as to calculate the estimation roll rate P (the above equation (7)). That is, the roll rate estimation circuit 36 calculates the roll rate component P·sin α by subtracting yaw rate component R·cos θb·cos α included in the detection angular velocity ω, that is, (g/V)·sin θb·cos α, from the detection angular velocity ω detected by the angular velocity sensor 22, and divides this value by sin α, so as to calculate the estimation roll rate P. As described above, the roll rate estimation circuit 36 calculates the estimation roll rate P on the basis of the detection angular velocity ω from the angular velocity sensor 22 and the vehicle speed V inputted to the yaw rate estimator 42. The angular velocity integration circuit 38 integrates the estimation roll rate P so as to calculate the moving body bank angle θb (the above equation (8)).

Figure 6:
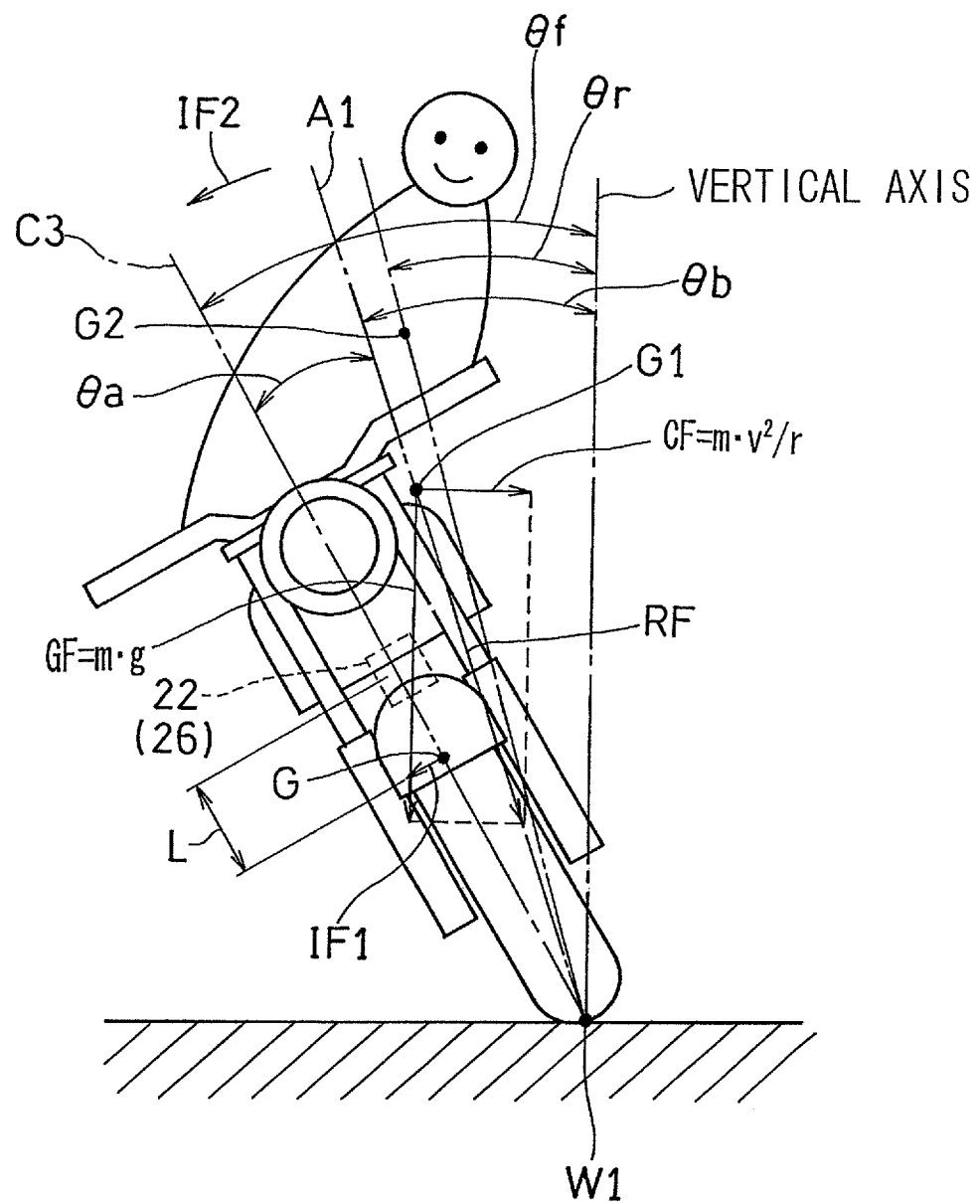
FIG. 6 is a front view showing a banked condition in the case where the posture of a rider is displaced to one side in a vehicle widthwise direction with respect to the center line of a vehicle body.

A method for detecting the estimation bank angle θf of the vehicle body by means of the correcting section 30 in the case where the posture of the rider is displaced to one side in the vehicle widthwise direction with respect to the center line of the vehicle body, that is, during lean-out or lean-in, will be described with reference to FIG. 6. The lean-out refers to a riding manner in which the rider's body is positioned at the outer side of a corner with respect to the center line of the vehicle body, and the lean-in refers to a riding manner in which the rider's body is positioned at the inner side of the corner with respect to the center line of the vehicle body. FIG. 6 shows a lean-out state. During lean-out or lean-in, the posture of the rider is displaced from the center line of the vehicle body, and thus the moving body bank angle θb does not agree with the estimation bank angle θf of the vehicle body. In a cornering state, the gravitational force GF (=m·g) and the centrifugal force CF of the moving body shown in FIG. 3 are in balance with each other at the angle θf. When a vector resultant force of the gravitational force GF and the centrifugal force CF is denoted by RF (=m·f), the following equation is established.

[Math. 3]

$$RF = \frac{GF}{\cos\theta b} \quad (9)$$

$$f = \frac{g}{\cos\theta b}$$

At this time, the difference value θa of the angle resulting from the difference between the center of gravity G of the vehicle body and the center of gravity G1 of the moving body is detected by the inertia force sensor 26.

$$\theta a = \sin^{-1}(IF1/f) \quad (10)$$
$$= \sin^{-1}(IF1 \cdot \cos\theta b/g)$$

Here, IF1 is an inertia force about the longitudinal axis acting on the vehicle body.

The detection value IF of the inertia force sensor 26 includes, in addition to the inertia force IF1 about the longitudinal axis, influence of an angular acceleration about the longitudinal axis. Thus, for obtaining the inertia force IF1, it is necessary to correct the detection value IF such that the acceleration force IF2 about the longitudinal axis is eliminated therefrom. As shown in FIG. 3, in the bank angle estimator 28, the estimation roll rate P is calculated in the process of estimating the moving body bank angle θb. The correction calculator 32 of the correcting section 30 calculates the acceleration force IF2 included in the detection value IF of the inertia force sensor 26, by the following equation (11), and calculates the inertia force IF1 by the following equation (12). The component (acceleration force) IF2 in the role rate P may be obtained by differentiating the estimation bank angle θb of the moving body twice.

[Math. 4]

$$IF2 = \frac{d}{dt} P \times L \tag{11}$$

Here, L is the distance from the roll rotation center of gravity G of the vehicle body to the inertia force sensor 26.

$$IF1 = (IF - IF2) \tag{12}$$

When equation (12) is substituted into the above equation (10), the difference value θa is obtained by the following equation (13). That is, the difference value calculator 35 calculates the difference value θa by equation (13).

$$\begin{aligned}\theta a &= \sin^{-1}((IF - IF2)/f) \\ &= \sin^{-1}((IF - IF2) \cdot \cos\theta b / g)\end{aligned} \tag{13}$$

The estimation bank angle θf of the vehicle body is obtained on the basis of the difference value θa obtained by equation (13) and the moving body bank angle θb estimated by the bank angle estimator 28 in FIG. 2 (θf=θb+θa). Feedback of the estimation bank angle θf of the vehicle body to the feedback circuit 40 is performed, and the estimation roll rate P is calculated by the following equation (14).

[Math. 5]

$$P = \frac{\omega - \frac{g}{V} \cdot \tan\theta b \cdot \cos\theta f \cdot \cos\alpha}{\sin\alpha} \tag{14}$$

Thus, the accuracy of the estimation roll rate P in the lean-in or lean-out state improves.

The estimation bank angle θf of the vehicle body obtained by the bank angle detection device 20 is used, for example, for control of output of the engine during cornering and control of the vehicle body such as a suspension and the steering handle. Examples of the control of output of the engine during cornering include slip inhibition control during cornering, acceleration control after cornering, and engine brake control during cornering. In addition, by determining a corner entry state or a corner exit state, the engine and the vehicle body can be controlled in accordance with corner entry or corner exit. Moreover, the estimation bank angle θf of the vehicle body can be used for adjustment of the illumination range of the headlamp device 11 (FIG. 1).

In the present embodiment, a single output ω of the angular velocity sensor 22 includes a roll rate component and a yaw rate component, but the angular velocity sensor 22 may be disposed such that the angular velocity sensor 22 outputs only a roll rate component. In addition, the method for calculating the estimation bank angle θb of the moving body is not limited to the method according to the present embodiment, and, for example, the estimation bank angle θb may be obtained by integrating the roll rate component of the output of the angular velocity sensor 22.

The outer periphery of each wheel is formed in such a shape that, when the wheel is cut along a plane passing through the axle thereof, the radius of the wheel is the largest at the position of the vehicle widthwise center and the radial dimension of the wheel gradually decreases from the position of the center in the vehicle widthwise direction toward the outer side in the vehicle widthwise direction. When no slip occurs during straight running, the radial dimension from the ground contact point CP to an axle (wheel center) O1 is the maximum.

In addition to the bank angle detection device 20, the motorcycle 1 according to the present embodiment includes the ground speed detection device 50 that obtains the ground-contact radius Ra from the wheel center O1 to the ground contact point CP shown in FIG. 9 on the basis of the estimation bank angle θf of the vehicle body and calculates the ground speed V as a vehicle speed from the rotational speed v of the wheel. The ground speed detection device 50 in FIG. 3 includes: the wheel speed sensor 24 that detects the rotational speed v of the wheel; a first storage section 52 that has stored the radius Ra of the wheel corresponding to the bank angle; and a ground speed calculator 54 that calculates the ground speed V from the estimation bank angle θf of the vehicle body and the radius Ra of the wheel in the first storage section 52. When the bank angle increases, the radius Ra of the wheel becomes smaller than the maximum radius at the center of the wheel in the vehicle widthwise direction.

The radius Ra of the wheel corresponding to the estimation bank angle θf of the vehicle body detected by the bank angle detection device 20 is extracted from the first storage section 52 and is then outputted to the ground speed calculator 54. The ground speed calculator 54 calculates a circumferential length from the radius Ra of the wheel, and multiplies the circumferential length and the rotational speed v of the wheel detected by the wheel speed sensor 24, with a multiplier 54, so as to calculate the ground speed V. In the present embodiment, the ground speed V is used as a vehicle speed.

The ground speed detection device 50 according to the present embodiment is configured to be able to detect the ground speed V at each of the front wheel 5 and the rear wheel 8, and selects a wheel for calculating the ground speed V, on the basis of a predetermined selection condition 55. Specifically, the ground speed detection device 50 calculates the ground speed V by using the front wheel 5 in a normal state. However, when deviation of the correlation between the front wheel speed and the ground speed V is detected or an abnormality in the wheel speed sensor 24f for the front wheel 5 is detected, the ground speed detection device 50 calculates the ground speed V by using the rear wheel 8. The deviation of the correlation between the front wheel speed and the ground speed V occurs, for example, during wheelie in which the front wheel 5 is raised from the road surface, or during slip of the front wheel 5. The slip of the front wheel 5 can be detected, for example, from information on an antilock brake system (ABS). However, the ground speed detection device 50 may calculate the ground speed V by using the rear wheel 8 in a normal state, and may calculate the ground speed V by using only either wheel. Moreover, a wheel used for calculating the ground speed at the time of corner entry may be different from that at the time of corner exit.

The ground speed is obtained by multiplying the radial dimension of the wheel by $2\pi$ and further multiplying the resultant value by the rotational speed of the wheel. In the case of detecting the ground speed by using the drive wheel, the rotational speed of a rotating body that rotates in conjunction with the drive wheel can be used. The front wheel and the rear wheel have different curved shapes. Specifically, the front wheel and the rear wheel are different from each other in the dimension in the vehicle widthwise direction, the diameter, and the curvature.

The ground speed detection device 50 includes the front wheel speed sensor 24f, a rear wheel speed sensor 24r and the first storage section 52. The first storage section 52 is provided with a front wheel storage area and a rear wheel storage area. The first storage section 52 is, for example, a read only memory (ROM), and storage of information is continued even in a state where power supply has stopped. In the first storage section 52, the radial dimension of each of the front and rear wheels corresponding to the bank angle is stored. Since the radial dimensions of both the front wheel and the rear wheel are stored, the radial dimensions corresponding to different vehicle widthwise directions or different cross-sectional shapes can be obtained for the front wheel and the rear wheel. Thus, the accuracy of detecting the ground speed improves. In addition, if the radial dimension is stored for each wheel that is mountable to the vehicle body, the ground speed can be accurately obtained even when the wheel is replaced.

In the present embodiment, the bank angle during cornering is detected on the basis of the calculated vehicle speed during cornering, but control of the engine output during cornering may be performed, or control of the suspension, the steering handle or the like during cornering may be performed, on the basis of the calculated vehicle speed during cornering. Examples of the control of the engine output during cornering include slip inhibition control during cornering, acceleration control after cornering, and engine brake control during cornering.

The ground speed detection device 50 acquires, from an external controller, information regarding a vehicle body state for determining whether the selection condition 55 is satisfied. Examples of the external controller include an ECU for controlling the vehicle body of the motorcycle, an engine ECU, and the bank angle detection device 20. The ECU for controlling the vehicle body controls, for example, the ABS, the suspension, the steering handle, and an auxiliary lamp. When it is determined, on the basis of the information regarding the vehicle body state, that a rear wheel selection condition is satisfied, the ground speed detection device 50 calculates the ground speed by using the rear wheel. When it is determined that the rear wheel selection condition is not satisfied, the ground speed detection device 50 calculates the ground speed by using the front wheel.

The rear wheel selection condition includes a wheelie state of the front wheel. The wheelie state of the front wheel can be determined, for example, by information being provided to the ground speed detection device 50, this information indicating that the front wheel is angularly displaced upward about the transverse axis of the vehicle body by a predetermined value or greater. Such information is obtained by the gyro sensor detecting an angular velocity about the transverse axis, or is obtained also by detecting an amount of expansion/contraction of a suspension at each of the front and rear wheels.

The rear wheel selection condition includes a slip state of the front wheel. The slip state of the front wheel can be determined, for example, by information being provided to the ground speed detection device 50, this information indicating that a slip amount of the front wheel is larger than that of the rear wheel by a predetermined value or greater as during braking, on the basis of the difference between the rotational speeds of the front and rear wheels. In addition, the rear wheel selection condition may be satisfied when an amount of braking of a front wheel brake is larger than that of a rear wheel brake. Similarly, the rear wheel selection condition may be satisfied when it is determined that the front wheel speed sensor or the vehicle speed detected by using the front wheel rotational speed is abnormal.

During acceleration or during braking by engine brake, the ground speed may be calculated by using the front wheel. Alternatively, the ground speed may be calculated by using both the front wheel and the rear wheel. In this case, for example, the ground speed is calculated by using the average of the rotational speeds of both wheels. Still alternatively, the ground speed may be calculated by using the rear wheel at the time of corner entry, and the ground speed may be calculated by using the front wheel at the time of corner exit.

In the present embodiment, the radial dimension Ra is extracted by using the estimation bank angle θf of the vehicle body, but may be extracted by using the moving body bank angle θb. In addition, other than using the bank angle, the radial dimension may be extracted by using a bank-related value related to the bank angle. For example, since the difference between the front wheel speed and the rear wheel speed corresponds to the bank angle, when the front wheel widthwise dimension is smaller than the rear wheel widthwise dimension, the front wheel speed becomes higher than the rear wheel speed as the bank angle increases. As described above, the radial dimension can be extracted by using an amount of bank including either the bank angle or the bank-related value. Moreover, when a bank angle speed or a bank angle acceleration correlates with the bank angle, the radial dimension may be extracted on the basis of the bank angle speed.

The motorcycle 1 that is provided with the bank angle detection device 20 according to the present embodiment includes a rider posture estimation device 56 that estimates the posture angle θr of the rider with respect to the vehicle body axis C3. The rider posture estimation device 56 includes: a second storage section 58 that has stored a relationship between the estimation bank angle θb of the moving body and the estimation bank angle θf of the vehicle body; and a rider posture estimator 60 that estimates the posture angle θr of the rider from the detection values of the inertia force sensor 26 and the bank angle estimator 28 on the basis of the relationship stored in the second storage section 58.

The relationship between the moving body bank angle θb and the estimation bank angle θf of the vehicle body during lean-in or during lean-out is determined depending on the motorcycle 1. In the second storage section 58, the relationship between the moving body bank angle θb and the estimation bank angle θf of the vehicle body is previously stored. In addition, since a relationship of (difference value θa)=(moving body bank angle θb)−(estimation bank angle θf of vehicle body) is established, if two values of θa, θb and θf is obtained, the remaining one value can be calculated.

The rider posture estimator 60 estimates the posture angle θr of the rider about the vehicle body axis from the force IF about the longitudinal axis, that acts on the vehicle body and is detected by the inertia force sensor 26, and the moving body bank angle θb estimated by the bank angle estimator 28, on the basis of the relationship stored in the second storage section 58. Since the difference value θa is calculated on the basis of the force IF detected by the inertia force sensor 26 as described above, the estimation bank angle θf of the vehicle body is also estimated from the difference value θa and the moving body bank angle θb. Furthermore, the posture angle θr of the rider, that is, the position of the center of gravity G2 of the rider, is estimated from the moving body bank angle θb and the estimation bank angle θf of the vehicle body, on the basis of the relationship stored in the second storage section 58.

Figure 7:
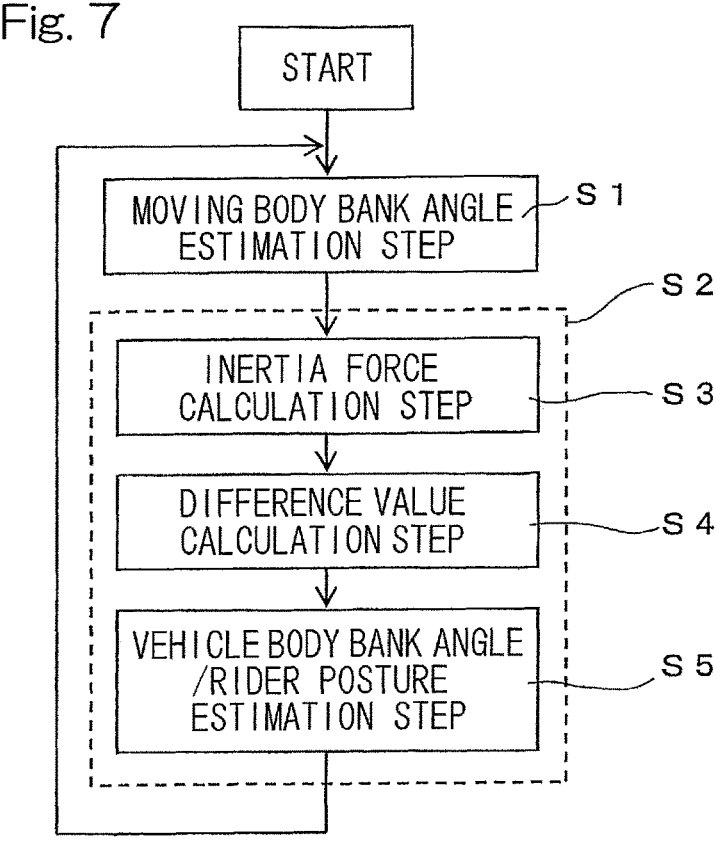
FIG. 7 is a flowchart showing steps of a bank angle estimation method for the motorcycle.

FIG. 7 is a flowchart showing steps of a bank angle estimation method and a rider posture estimation method. As shown in FIG. 7, the bank angle estimation method and the rider posture estimation method according to the present embodiment include a moving body bank angle estimation step (balance bank angle estimation step) S1 and a correction step S2. In the moving body bank angle estimation step S1, the moving body bank angle θb is estimated by the bank angle estimator 28.

In the correction step S2, the moving body bank angle θb estimated in the moving body bank angle estimation step S1 is corrected on the basis of an inertia force about the longitudinal axis acting on the motorcycle 1, so as to calculate the estimation bank angle θf of the vehicle body. The correction step S2 includes an inertia force calculation step S3, a difference value calculation step S4, and a vehicle body bank angle/rider posture estimation step S5.

In the inertia force calculation step S3, the inertia force IF1 about the longitudinal axis is calculated on the basis of the output IF of the inertia force sensor 26 and the estimation roll rate P obtained in the process of calculating the moving body bank angle θb. In the difference value calculation step S4, the difference value θa is calculated on the basis of the inertia force IF1 obtained in the inertia force calculation step S3 and the moving body bank angle θb estimated in the moving body bank angle estimation step S1. Subsequently, in the vehicle body bank angle/rider posture estimation step S5, the estimation bank angle θf of the vehicle body and the posture angle θr of the rider are estimated by correcting the moving body bank angle θb estimated in moving body bank angle estimation step S1 by using the difference value θa obtained in the difference value calculation step S4.

Figure 8:
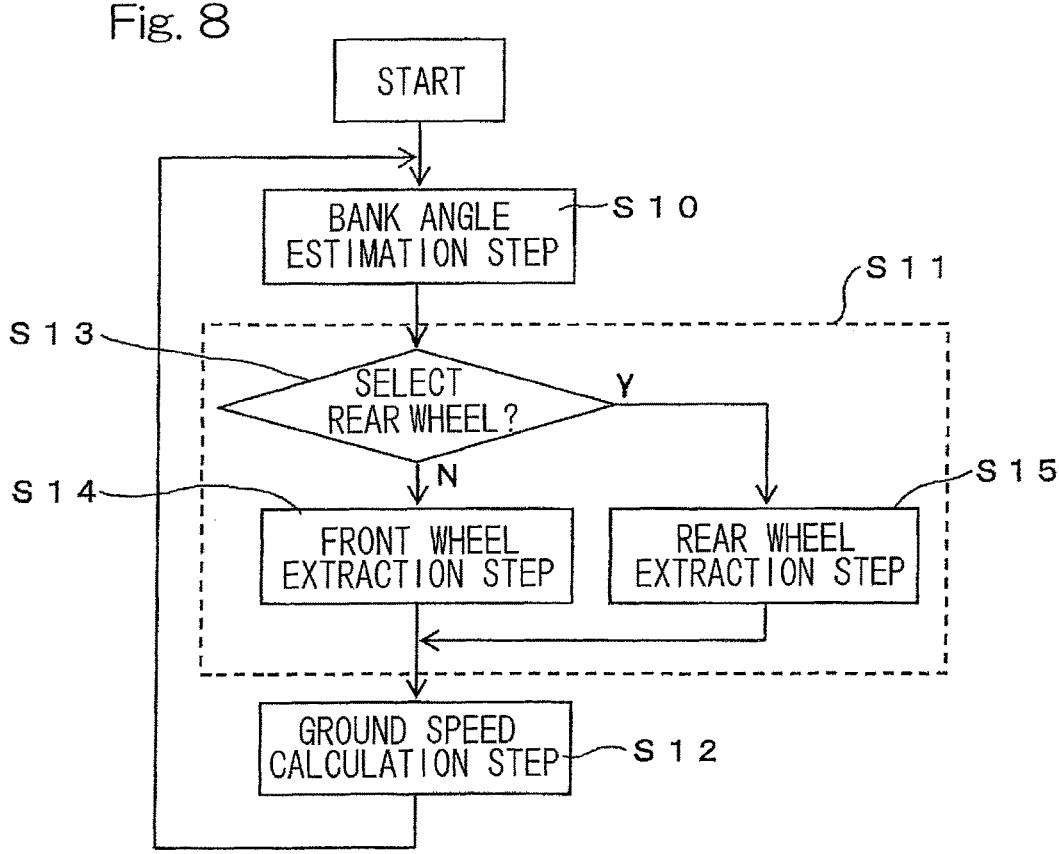
FIG. 8 is a flowchart showing steps of a ground speed calculation method for the motorcycle.

FIG. 8 is a flowchart showing steps of a ground speed detection method. As shown in FIG. 8, the ground speed detection method according to the present embodiment includes a bank angle estimation step S10, an extraction step S11, and a ground speed calculation step S12. In the bank angle estimation step S10, the estimation bank angle θf of the vehicle body is obtained by the bank angle detection device 20.

In the extraction step S11, the radial dimension of the wheel corresponding to the estimation bank angle θf of the vehicle body obtained in the bank angle estimation step S10 is extracted from the first storage section 52. The extraction step S11 includes a wheel selection step S13, a front wheel extraction step S14, and a rear wheel extraction step S15. In the wheel selection step S13, a wheel for calculating the ground speed is selected on the basis of the selection condition 55 from information on the vehicle body. Specifically, in the wheel selection step S13, whether the rear wheel selection condition is satisfied is determined. When the rear wheel selection condition is not satisfied, the method proceeds to the front wheel extraction step S14. On the other hands, when the rear wheel selection condition is satisfied, the method proceeds to the rear wheel extraction step S15.

In the front wheel extraction step S14 (or the rear wheel extraction step S15), the radial dimension of the front wheel (or the rear wheel) corresponding to the estimation bank angle θf of the vehicle body obtained in the bank angle estimation step S10 is extracted from the first storage section 52. In the ground speed calculation step S12, the ground speed of the motorcycle 1 is calculated on the basis of the radial dimension of the wheel extracted in the extraction step S11 and the rotational speed of the wheel detected by the wheel speed sensor 24.

According to the above configuration, as shown in FIG. 3, the moving body bank angle θb is corrected on the basis of the inertia force IF1 about the longitudinal axis acting on the vehicle body, so as to calculate the estimation bank angle θf of the vehicle body. Thus, even when there is a difference between the center of gravity G of the vehicle body and the center of gravity G1 of the moving body, the estimation bank angle θf of the vehicle body can be calculated more accurately than when the moving body bank angle θb is estimated as the bank angle of the vehicle body. In addition, by using the inertia force obtained by eliminating the acceleration force IF2, influence of an acceleration about the longitudinal axis, that acts on the vehicle body and occurs in a transition period of cornering of the vehicle body, can be eliminated, and therefore, the accuracy of estimation in the transition period improves. That is, the estimation bank angle θf of the vehicle body in a state where the bank angle speed of the vehicle body changes over time, that is, at the time of start of cornering or at the time of end of cornering, can be accurately calculated.

The correcting section 30 calculates the difference value θa of the estimation bank angle θf of the vehicle body with respect to the moving body bank angle θb on the basis of the inertia force IF1 about the longitudinal axis acting on the vehicle body, the centrifugal force CF acting on the moving body and the gravitational force GF acting on the moving body during cornering, and then calculates the estimation bank angle θf of the vehicle body on the basis of the difference value θa. By calculating the difference value θa on the basis of the inertia force IF1 about the longitudinal axis acting on the vehicle body as described above, the vehicle body bank angle θf can be estimated without using a complicated equation of motion.

The correcting section 30 includes the correction calculator 32 that eliminates the acceleration force IF2 about the longitudinal axis acting on the vehicle body from the force IF about the longitudinal axis detected by the inertia force sensor 26, so as to calculate the inertia force IF1 about the longitudinal axis acting on the vehicle body. Further, the correcting section 30 calculates the estimation bank angle θf of the vehicle body on the basis of the inertia force IF1 about the longitudinal axis calculated by the correction calculator 32. According to this configuration, although a combination of the inertia force IF1 and the acceleration force IF2 is detected by the inertia force sensor 26, influence of an angular acceleration occurring in a transition state such as during sudden banking can be eliminated by eliminating the acceleration force IF2. As a result, the accuracy of detecting the estimation bank angle θf of the vehicle body improves.

The correcting section 30 includes the sudden change preventer 34 that inhibits a sudden change in the estimation roll rate P, and the correction calculator 32 calculates the inertia force IF1 about the longitudinal axis acting on the vehicle body, by using the estimation roll rate Pf resulting from the processing by the sudden change preventer 34 composed of a low-pass filter. By eliminating a high-frequency component as described above, influence of noise is inhibited. Furthermore, the sudden change preventer 34 calculates the inertia force IF1 about the longitudinal axis acting on the vehicle body, by using a value within a predetermined limit range, of the estimation roll rate P. Thus, overshoot of a calculated value, a calculation error, and the like can be prevented. Moreover, the sudden change preventer 34 is able to fix an output to a critical value in the predetermined limit range when the output exceeds the limit range.

A vehicle body vibration component and a vehicle body impact component due to irregularities of a road surface, that are included in the output IF of the inertia force sensor 26, are eliminated by the low-pass filter 27. In addition, noise is removed by the sudden change preventer 34, and therefore, a differentiation value in differentiating the estimation roll rate P can be prevented from suddenly changing. As a result, the accuracy of calculating the inertia force IF1 about the longitudinal axis improves.

The angular velocity sensor 22 is disposed so as to be tilted about the transverse axis at the predetermined tilt angle $\alpha$ with respect to the longitudinal axis C1 of the vehicle body, and detects the roll rate P component about the longitudinal axis and the yaw rate R component about the up-down axis. In addition, the feedback circuit 40 calculates the estimation yaw rate R on the basis of the ground speed V and the moving body bank angle $\theta bo$ calculated last, and the estimation yaw rate R is corrected by performing feedback of the estimation bank angle $\theta f$ of the vehicle body; Then, the yaw rate component of the angular velocity sensor 22 is calculated from the corrected estimation yaw rate R and the tilt angle $\alpha$, and negative feedback of this yaw rate component value to the detection value $\omega$ of the angular velocity sensor 22 is performed. The bank angle estimator 28 estimates the moving body bank angle $\theta b$ from the detection value $\omega$ after the negative feedback. Since the yaw rate component is eliminated in consideration of the difference between the center of gravity G1 of the moving body and the center of gravity G of the vehicle body as described above, the accuracy of calculating the moving body bank angle $\theta b$ is high.

The rider posture estimation device 56 that estimates the posture angle $\theta r$ of the rider with respect to the vehicle body axis C3 is provided. By recording the estimated rider's posture, for example, in a recorder, the posture of the rider during cornering can be confirmed after running. The confirmation of the rider posture after running as described above can be useful for improvement of driving technique, analysis of a cause of falling, and the like. In addition to the above, the engine and the vehicle body can be controlled on the basis of the posture angle $\theta r$ of the rider. Specifically, by grasping the posture angle $\theta r$ of the rider, an operation at the time of corner entry or at the time of corner exit is grasped, and therefore, the engine and the vehicle body can be controlled in accordance with corner entry or corner exit.

The ground speed detection device 50 is provided which obtains ground-contact radius Ra from the wheel center O1 to the ground contact point CP, on the basis of the estimation bank angle $\theta f$ of the vehicle body, and calculates the ground speed V as a vehicle speed from the rotational speed v of the wheel. Thus, since the ground speed V is calculated on the basis of the radius Ra of the wheel corresponding to the estimation bank angle $\theta f$ of the vehicle body during cornering, the vehicle speed can be accurately detected even during cornering. As a result, the accuracy of calculating the estimation bank angle $\theta f$ of the vehicle body and the accuracy of calculating the estimation roll rate P in the bank angle detection device 20 improve.

The ground speed detection device 50 is configured to be able to detect the ground speed V at each of the front wheel 5 and the rear wheel 8, and selects a wheel for calculating the ground speed V, on the basis of the predetermined selection condition 55. Thus, the ground speed V is calculated according to a situation during running, and therefore, the vehicle speed can be more accurately detected.

Specifically, the ground speed V is calculated by using the front wheel 5 in a normal state, and the ground speed V is calculated by using the rear wheel 8 when separation of the front wheel 5 from the road surface is detected by a pitch angle sensor or when an abnormality in the wheel speed sensor 24$f$ for the front wheel 5 is detected. In addition, separation of the front wheel 5 from the road surface may be detected by detecting a difference between change amounts of rotational frequencies of the front wheel 5 and the rear wheel 8 or extension of the front fork 4 reaching its limit. Although the rear wheel 8, which is a drive wheel, easily slips, the vehicle speed can be accurately detected by calculating the ground speed V using the front wheel 5, which is a driven wheel, in a normal state. In addition, since the ground speed V is calculated by using the rear wheel 8 when the front wheel 5 is separated from the road surface due to wheelie, when the front wheel 5 slides on the road surface due to a slip, or when an abnormality in the wheel speed sensor 24$f$ for the front wheel 5 is detected, the accuracy of detecting the vehicle speed improves.

The present invention is not limited to the above-described embodiment, and various additions, changes, or deletions can be made without departing from the gist of the present invention. For example, the bank angle estimator 28 is not limited to the one in the above-described embodiment. In addition, the correcting section 30 may estimate an acceleration about the longitudinal axis acting on the vehicle body, on the basis of a force about the longitudinal axis that is detected by the inertia force sensor 26 and information regarding the position at which the inertia force sensor 26 is mounted. Thus, the flexibility in disposing the sensor improves. Therefore, these are construed as included within the scope of the present invention.

REFERENCE NUMERALS

5 . . . front wheel
8 . . . rear wheel
20 . . . bank angle detection device (bank amount sensor)
24 . . . wheel speed sensor
50 . . . ground speed detection device
54 . . . ground speed calculator
55 . . . selection condition
58 . . . second storage section

What is claimed is:

1. A ground speed detection device for a vehicle that corners in a banked condition, the ground speed detection device comprising:

a front wheel speed sensor configured to detect rotational speed of a front wheel;

a rear wheel speed sensor configured to detect rotational speed of a rear wheel;

a bank amount sensor configured to detect an amount of bank of a vehicle body on the basis of a detected angular velocity of the vehicle and at least one of the rotational speed of the front wheel or the rotational speed of the rear wheel;
a storage section having stored a radial dimension, between an axle and a road surface contact point of each of the front wheel and the rear wheel, which dimension varies according to the amount of bank of the vehicle body; and
a ground speed calculator configured:
to extract the radial dimension corresponding to the amount of bank detected by the bank amount sensor, from the storage section,
to calculate a ground speed of the vehicle during cornering on the basis of the extracted radial dimension, the rotational speed of the front wheel detected by the front wheel speed sensor, and the rotational speed of the rear wheel detected by the rear wheel speed sensor, and
to output the calculated ground speed of the vehicle to an electronic control unit,
wherein the ground speed detection device selects the front wheel speed sensor or the rear wheel speed sensor for calculating the ground speed on the basis of a predetermined selection condition,
wherein at a time of corner exit, the ground speed is calculated by using only the front wheel speed sensor, and
at a time of corner entry, the ground speed is calculated by using only the rear wheel speed sensor.

2. The ground speed detection device as claimed in claim 1, wherein the predetermined selection condition includes a rear wheel selection condition for setting the rear wheel speed sensor for calculating the ground speed,
the rear wheel selection condition including the front wheel being raised or the front wheel slipping on a road surface, wherein
when the rear wheel selection condition is satisfied, the ground speed is calculated by using the rear wheel speed sensor, and
when the rear wheel selection condition is not satisfied, the ground speed is calculated by using the front wheel speed sensor.

3. The ground speed detection device as claimed in claim 1, wherein when an abnormality in a wheel speed sensor for one of the front wheel speed sensor or the rear wheel speed sensor is detected, the ground speed is calculated by using the other wheel speed sensor.

4. The ground speed detection device as claimed in claim 1, wherein the bank amount sensor detects the amount of bank on the basis of a balance state, where a centrifugal force acting on a moving body including the vehicle and a loaded body on the vehicle, and a gravitational force acting on the moving body during cornering, are in balance with each other.

5. The ground speed detection device as claimed in claim 4, wherein the bank amount sensor calculates a moving body bank angle on the basis of an inertia force about a longitudinal axis of the vehicle acting on the vehicle body, and further corrects the moving body bank angle, to detect, as the amount of bank, a vehicle body bank angle that is a gradient of a center of gravity of the vehicle body with respect to a vertical line.

6. The ground speed detection device as claimed in claim 1, wherein during acceleration or during braking by engine braking, the ground speed is calculated by using the front wheel speed sensor.

7. A ground speed detection device for a vehicle that corners in a banked condition, the ground speed detection device comprising:
a wheel speed sensor configured to detect a rotational speed of a wheel;
a bank amount sensor configured to detect an amount of bank of a vehicle body, the bank amount sensor including:
an angular velocity sensor,
an inertia force sensor,
a roll rate estimation circuit which estimates a roll rate on the basis of an output value from the angular velocity sensor and a ground speed,
a low-pass filter configured to remove noise from an output value of the inertia force sensor, and
a change preventer that inhibits a change in the estimated roll rate;
a storage section having stored a radial dimension, between an axle and a road surface contact point of the wheel, corresponding to the amount of bank of the vehicle body; and
a ground speed calculator configured to extract the radial dimension corresponding to the amount of bank detected by the bank amount sensor, from the storage section, and to calculate the ground speed of the vehicle during cornering on the basis of the extracted radial dimension and the rotational speed of the wheel detected by the wheel speed sensor,
wherein the bank amount sensor detects the amount of bank based on a previously calculated ground speed from the ground speed calculator.

8. A ground speed detection device for a vehicle that corners in a banked condition, the ground speed detection device comprising:
a wheel speed sensor configured to detect a rotational speed of a wheel;
a bank amount sensor configured to estimate an amount of bank of a vehicle body;
a storage section storing a radial dimension, between an axis and a road surface contact point of the wheel, corresponding to the amount of bank of the vehicle body; and
a ground speed calculator configured to extract the radial dimension corresponding to the amount of bank estimated by the bank amount sensor, from the storage section, and to iteratively calculate a current ground speed of the vehicle on the basis of the extracted radial dimension and the rotational speed of the wheel detected by the wheel speed sensor, and to output the calculated current ground speed of the vehicle to an electronic control unit, wherein
the bank amount sensor estimates the amount of bank, based on a previously calculated ground speed from the ground speed calculator.

9. The ground speed detection device as claimed in claim 8, wherein the wheel speed sensor is a front wheel speed sensor, and
wherein at a time of corner exit, the current ground speed is calculated by using the front wheel speed sensor.

10. The ground speed detection device as claimed in claim 8, wherein the wheel speed sensor is a rear wheel speed sensor, and
wherein at a time of corner entry, the current ground speed is calculated by using the rear wheel speed sensor.

11. The ground speed detection device as claimed in claim 8, wherein the wheel speed sensor is a front wheel speed sensor or a rear wheel speed sensor, wherein at a time of corner exit, the current ground speed is calculated by using the front wheel speed sensor, and wherein at a time of corner entry, the current ground speed is calculated by using the rear wheel speed sensor.

12. A ground speed detection device for a vehicle that corners in a banked condition, the ground speed detection device comprising:
   a front wheel speed sensor configured to detect rotational speed of a front wheel;
   a rear wheel speed sensor configured to detect rotational speed of a rear wheel;
   a bank amount sensor configured to detect an amount of bank of a vehicle body;
   a storage section having stored a radial dimension, between an axle and a road surface contact point of each of the front wheel and the rear wheel, which dimension varies according to the amount of bank of the vehicle body; and
   a ground speed calculator configured:
      to extract the radial dimension corresponding to the amount of bank detected by the bank amount sensor, from the storage section,
      to calculate a ground speed of the vehicle during cornering on the basis of the extracted radial dimension and the rotational speed of one of the front wheel detected by the front wheel speed sensor or the rear wheel detected by the rear wheel speed sensor, and
      to output the calculated ground speed of the vehicle to an electronic control unit,
   wherein the ground speed detection device selects the front wheel speed sensor or the rear wheel speed sensor for calculating the ground speed on the basis of a predetermined selection condition,
   wherein at a time of corner exit the ground speed is calculated by using only one wheel speed sensor, the corner exit being a transition from a cornered state of the vehicle toward an upright state.

13. The ground speed detection device as claimed in claim 12, wherein at the time of corner exit, the ground speed is calculated by using the front wheel speed sensor.

14. The ground speed detection device as claimed in claim 12, wherein at a time of corner entry, the ground speed is calculated by using the rear wheel speed sensor.

15. The ground speed detection device as claimed in claim 12, wherein at the time of corner exit, the ground speed is calculated by using the front wheel speed sensor, and wherein at a time of corner entry, the ground speed is calculated by using the rear wheel speed sensor.

* * * * *